United States Patent
Venkataramani et al.

(10) Patent No.: US 11,777,823 B1
(45) Date of Patent: Oct. 3, 2023

(54) METRIC ANOMALY DETECTION ACROSS HIGH-SCALE DATA

(71) Applicant: Amazon Technologies, Inc., Seattle, WA (US)

(72) Inventors: Eknath Venkataramani, Seattle, WA (US); Amit Jagannath Mhatre, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 27 days.

(21) Appl. No.: 17/535,455

(22) Filed: Nov. 24, 2021

(51) Int. Cl.
*H04L 43/0817* (2022.01)
*H04L 43/065* (2022.01)
*H04L 43/0823* (2022.01)

(52) U.S. Cl.
CPC ........ *H04L 43/0817* (2013.01); *H04L 43/065* (2013.01); *H04L 43/0823* (2013.01)

(58) Field of Classification Search
CPC H04L 43/0817; H04L 43/065; H04L 43/0823
USPC ........................................................ 709/224
See application file for complete search history.

(56) References Cited

U.S. PATENT DOCUMENTS

| | | | |
|---|---|---|---|
| 7,246,156 B2 | 7/2007 | Ginter et al. | |
| 8,887,286 B2 | 11/2014 | Dupont et al. | |
| 2007/0192474 A1* | 8/2007 | Decasper | H04L 67/306 709/223 |
| 2014/0369198 A1* | 12/2014 | Rinne | H04W 40/02 370/235 |
| 2017/0346853 A1* | 11/2017 | Wyatt | H04L 63/1425 |
| 2018/0198796 A1* | 7/2018 | Chien | H04L 61/5007 |
| 2019/0007436 A1* | 1/2019 | Dods | H04L 63/1425 |
| 2020/0136890 A1* | 4/2020 | To | G06K 9/6267 |
| 2021/0109829 A1* | 4/2021 | Lee | G16H 30/40 |
| 2021/0243208 A1* | 8/2021 | Rubin | G06F 21/566 |
| 2021/0306372 A1* | 9/2021 | Koral | H04L 43/16 |
| 2021/0377215 A1* | 12/2021 | Wang | H04L 63/0227 |
| 2022/0158894 A1* | 5/2022 | Moulik | H04L 41/065 |

* cited by examiner

*Primary Examiner* — Meng Vang
(74) *Attorney, Agent, or Firm* — Robert C. Kowert; Kowert, Hood, Munyon, Rankin & Goetzel, P.C.

(57) ABSTRACT

An anomaly detection service of a provider network may be used to efficiently monitor for metric anomalies across a large number of IoT devices using mandatory and optional values for metrics. A client may configure any number of mandatory and optional values for a metric to be collected from IoT devices of a fleet. The client may also configure one or more criteria to by used for evaluating the mandatory values (e.g., a threshold percentage such as 99%). When the service receives metric values for the metric, the service determines whether the values satisfy the criteria for the mandatory value. If not, then the service indicates an anomaly. The service may also determine if any values other than the mandatory and optional values are present. If not, then the service indicates an anomaly.

20 Claims, 8 Drawing Sheets

METRIC ANOMALY DETECTION ACROSS HIGH-SCALE DATA

BACKGROUND

The Internet of Things (IoT) is a phrase given for the interconnection of computing devices scattered around the globe within the existing internet infrastructure. Clients (e.g., customers) of a remote service provider may leverage the internet-based connectivity of IoT devices (also referred to herein as edge devices) by using a service offered by the service provider. For example, temperature sensors at a client site may collect temperature values for different equipment and transmit them to the service provider for analysis, such as determining whether a machine needs servicing.

A client's network may include one or more different fleets of edge devices. The edge devices of a particular fleet may operate in the same or similar environment and may exhibit similar behavior with respect to device activity. For example, all security cameras operated by a particular company may stream video data from the camera to the company's web server (e.g., data.company1.com) using a certain protocol (e.g., hyper-text transfer protocol (HTTP)). Due to device malfunction or other issues, an operator may sometimes remotely log in to the device to debug the issue and fix it. To allow for this, the edge device may listen on a debugging port (e.g., port 22) using a certain protocol (e.g., secure socket shell (SSH)) to communicate using another domain (e.g., debug.company1.com).

Any other communication to and from the edge device may be considered an anomaly and therefore a potential security risk (e.g., streaming data to a new web address, such as attacker.com). Identification of such situations is crucial from an information security standpoint. However, due to the large number of edge devices in a fleet, it can be extremely challenging to quickly identify such anomalies (e.g., to mitigate the impact) across high-scale data (e.g., data from multiple millions of devices).

Figure 1:
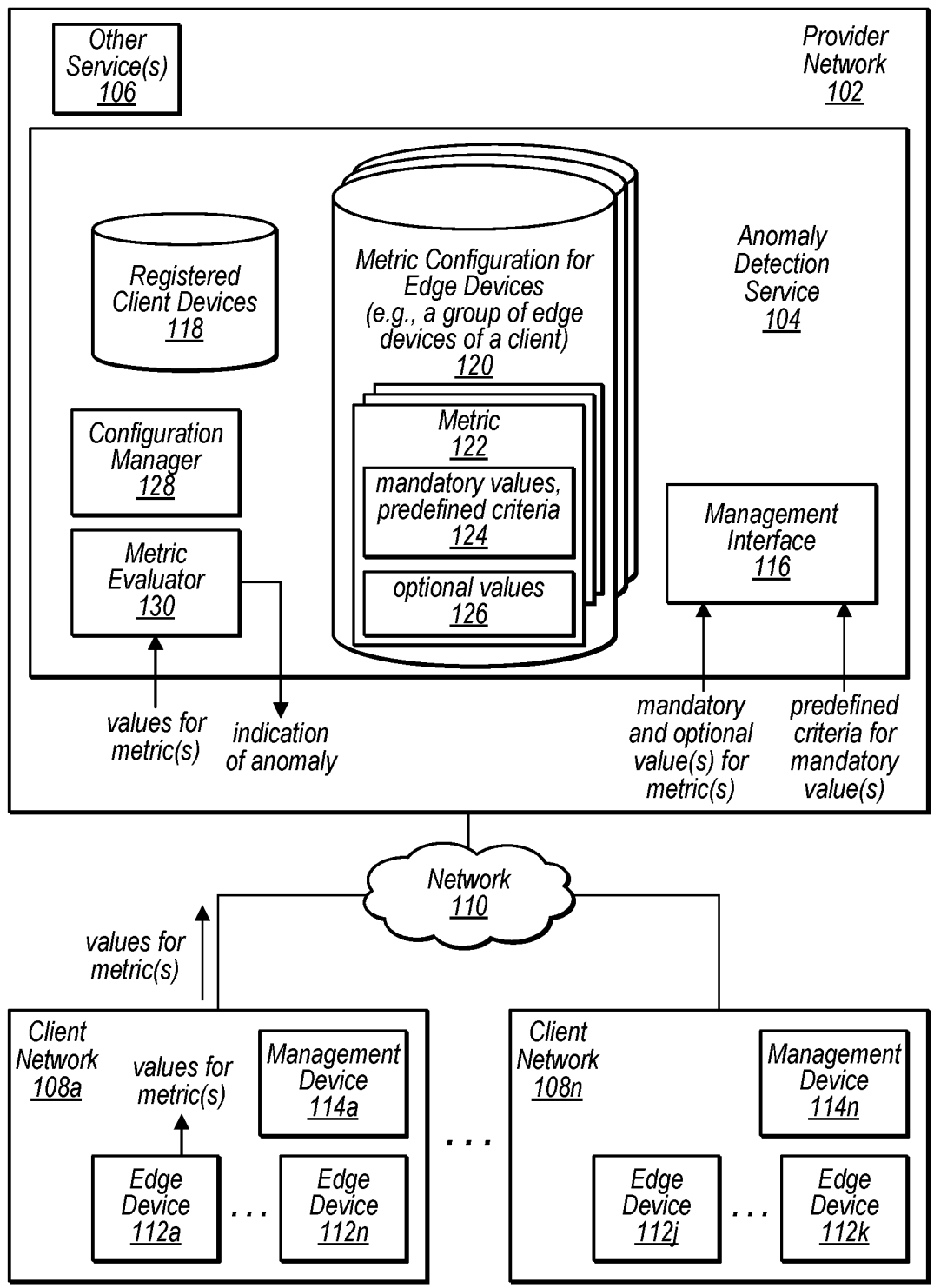
FIG. 1 is a logical block diagram illustrating a system for monitoring for metric anomalies across high-scale data using mandatory and optional values, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to monitor for metric anomalies across high-scale data using mandatory and optional values, according to some embodiments. In embodiments, monitoring for metric anomalies across high-scale data using mandatory and optional values may allow for identification and notification of anomalies at a much faster rate while consuming fewer computing resources, compared to traditional techniques.

In various embodiments, a client may configure an anomaly detection service of a provider network to use mandatory and/or optional values for any number of metrics received from any number of edge devices in order to efficiently monitor metric values and determine whether anomalies exist in metric values. If so, then the client may be notified of anomalies that were detected in any of the values of any of the metrics, for any number of the devices. This allows a client (e.g., a user or administrator of a company) to configure and implement anomaly detection capability across any number of edge devices in a much shorter amount of time than traditional techniques for configuring/implementing anomaly detection.

In embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 8 and described below.

This specification begins with a description of a system for monitoring for metric anomalies across high-scale data using mandatory and optional values. A number of different methods and techniques for monitoring for metric anomalies across high-scale data using mandatory and optional values, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for monitoring for metric anomalies across high-scale data using mandatory and optional values, according to some embodiments.

As shown, a provider network 102 includes an anomaly detection service 104 that implements monitoring for metric anomalies across high-scale data using mandatory and optional values. In the example embodiment, the provider network 102 may include any number of other services 106. For example, a service 106 may implement data storage services or compute services that may be used by the anomaly detection service to perform any of the functionality described herein. In some embodiments, a service 106 may execute a client-owned application that receives data from client edge devices and/or sends data to client edge devices.

In various embodiments, the anomaly detection service 104 may perform any number of tasks/functionality to manage any number of edge devices for any of the clients of the IoT service (e.g., device registration, provisioning any number edge devices, authentication of edge devices, routing to/from the edge devices to/from other services of the provider network). In various embodiments, any described functionality/tasks that may be performed by the anomaly detection service may instead be implemented, at least in part, by one or more of the other services 106 (e.g., storing information for registered edge devices, authentication and/or provisioning edge devices).

In the depicted embodiment, any number of clients of the anomaly detection service 104 may use the anomaly detection service 104 of the provider network 102 via communication between the anomaly detection service 104 and a remote client network 108 of a client of the anomaly detection service 104 (e.g., via a wide area network 110, such as the internet). For example, a client may own/manage the client network 108a, which may include any number of edge devices 112a-112n that may send data to the anomaly detection service 104 of the provider network 102 and/or receive data from the anomaly detection service 104 of the provider network 102. Similarly, any number of other clients may use the IoT service 104 with any number of other edge devices in the same or similar manner (e.g., using any number of edge devices 112 of other client network(s)).

As shown, each client network 108 may include one or more management devices 114. A management device may be any type of computing device that implements a user interface (e.g., graphical user interface (GUI), command line interface, and/or application programming interface (API)) that allows a user (e.g., administrator) to input data (e.g., commands or configuration data such as mandatory values, optional values, predefined criteria for mandatory values, etc.).

The anomaly detection service 104 may include a management interface 116 that receives mandatory values, optional values, and/or predefined criteria for mandatory values (e.g., to be used for a group/fleet of edge devices) from the management device 114 of a client network. For example, the management interface 116 may receive mandatory values, optional values, and predefined criteria for mandatory values from the management device 114a of the client network 108a (e.g., based on user input).

In the example embodiment, the anomaly detection service 104 may also include a data store that stores data indicating any number of registered client devices 118 that are registered for any number of clients of the anomaly detection service 104. For example, a user may register edge devices 112 of client network 108a by providing unique identifiers and/or other data for any number of edge devices 112. In embodiments, the management interface 116 may receive the unique identifiers and/or other data from a management device 114 (e.g., based on user input).

As shown, another data store may store data indicating a metric configuration for edge devices 120 (e.g., a group/fleet of edge devices of a client). In embodiments, a given metric 122 may be assigned any number of mandatory values 124 (and predefined criteria) for the metric and/or any number of optional values 126 for the metric. In embodiments, the metric configuration for a given group of edge devices may indicate the configuration for any number of metrics that are received from the edge devices of the group. For example, the metric configuration for edge devices 120 may indicate the configuration for 10 different metrics that are received for edge devices 112a-112n from the client network 108a. In embodiments, a given metric configuration for a metric may indicate mandatory value(s), the predefined criteria for each mandatory value, and/or the optional value(s). As used herein, a "set" may mean "one or more." For example, a set of values may mean one or more values.

In embodiments, the metric configuration for edge devices 120 may indicate the configuration for metrics for any number of different groups/fleets of edge devices for a particular client and/or any number of different clients of the anomaly detection service. For example, the metric configuration for edge devices 120 may indicate the configuration for metrics for a group of edge devices 112a-112e of client A, the configuration for metrics for another group of edge devices 112f-112n of client A, and the configuration for metrics for a group of edge devices 112k-112j of client N.

In the example embodiment, the anomaly detection service 104 includes a configuration manager 128 that may configure any aspects/functionality of the anomaly detection service 104 (e.g., in response to client input and/or input from an administrator of the provider network 102). For example, the configuration manager 128 may configure a metric evaluator 130 to monitor values for any number of metrics that are received from edge devices and to determine whether anomalies exist in the received values, as described below.

In some embodiments, the anomaly detection service 104 may receive, from a client (e.g., via management interface 116), an indication that one or more values are to be assigned to a metric as one or more mandatory values for the metric for a group of edge devices (e.g., edge devices 112a-112n). For example, the anomaly detection service 104 may receive, from a client, a metric configuration request that indicates port 80 is to be a mandatory value for the "open ports" metric (e.g., port 80 is open/edge device is listening on port 80). In response to receiving one or more configuration requests for mandatory values from the client, the service may assign the one or more values to the metric as a mandatory value for the metric.

As used herein, a "mandatory value" may not necessarily refer to a value that must be present for every metric value of a particular metric that is received by the service. For example, a mandatory value may refer to a metric value that is present in at least a portion of the metric values that are received by the service for a particular metric (e.g., such that the presence of the mandatory value in the multiple received metric values satisfies one or more criteria).

The anomaly detection service 104 may also receive, from the client (e.g., via management interface 116), an indication that one or more values are to be assigned to the metric as one or more optional values for the metric for the group of edge devices. For example, the anomaly detection service 104 may receive, from a client, a metric configuration request that indicates port 22 is to be an optional value for the "open ports" metric (e.g., port 22 is open/edge device is listening on port 22). In response to receiving one or more configuration requests for optional values from the client, the service may assign the one or more values to the metric as an optional value for the metric.

In some embodiments, the anomaly detection service 104 may also receive, from the client (e.g., via management interface 116), an indication of one or more criteria to be used as predefined criteria for the mandatory value that the service may apply to received metric values in order to determine whether an anomaly is detected for the metric. For example, the service may receive an indication that at least a threshold percentage of a group of values received for the metric must include port 80 (or match port 80) as an open port. As an example, the threshold may be set to 99%. If a particular group of 100 metric values is received, but only 95 of the metric values include port 80 as one of the open ports, then the service may determine that an anomaly has been detected because less than 99% of the metric values of the group of collected metric values include port 80 as one of the open ports.

Note that in some embodiments, a given criterium that is to be used as a predefined criterium may be that every value of a group of values must include the mandatory value (e.g., every value must include/match port 80). In response to receiving one or more configuration requests for the one or more criteria to be used as predefined criteria for the mandatory value, the service may assign the one or more criteria to the metric to be used as predefined criteria for the mandatory value (e.g., as described below). In some embodiments, any number of mandatory values, optional values, and/or predefined criteria may be assigned by the service (or administrator) as default values and/or default predefined criteria (e.g., if the client does not provide the configuration information).

Note that in an embodiment, predefined criteria may also be used for any number of optional values. For example, the anomaly detection service 104 may also receive, from the client (e.g., via management interface 116), an indication of one or more criteria to be used as predefined criteria for an optional value (e.g., as a maximum number of times over a time period or maximum percentage of received metrics) that the service may apply to received metric values in order to determine whether an anomaly is detected for the metric. For example, the service may receive an indication that the optional value of port 22 may be included as one of the open ports in at most 10% of the metric values received for the metric (e.g., out of a group of metric values). If a particular group of 100 metric values is received, but 20 of the metric values include port 22 as one of the open ports, then the service may determine that an anomaly has been detected because over 10% of the metric values of the group of collected metric values include port 22 as one of the open ports.

In various embodiments, any number of mandatory values, optional values, and/or predefined criteria for mandatory values (e.g., to be used for a group/fleet of edge devices) may be determined based on profiling one or more edge devices over a period of time (e.g., using one or more of the group/fleet of edge devices or the same type of edge device to be used in the group/fleet). For example, a client (e.g., a company or other organization) may use a test lab environment to simulate use of the edge devices in production. By profiling the edge devices (e.g., collecting/analyzing collected values for different device metrics), the client (e.g., profiling software used by the client) may identify one or more mandatory values, one or more predefined criteria for the mandatory values, and/or one or more optional values to be assigned for any number of metrics. The client may provide the mandatory values, optional values, and/or predefined criteria for mandatory values to the service for metric configuration of the edge devices, as described above (e.g., for use in a production environment).

In some embodiments, any number of the mandatory values, optional values, and/or predefined criteria for mandatory values that are currently being used (e.g., for a group/fleet of edge devices in a production environment) may be updated/modified based on profiling the edge devices over a period of time as they are being used (e.g., in the production environment). For example, a client (e.g., a company or other organization) may use machine learning models and/or other artificial intelligence/logic in order to identify changes, variations, and/or patterns that occur for metric values that are collected for any number of metrics over a period of time. Based on the identified changes, variations, and/or patterns, the client (e.g., machine learning software used by the client) may identify one or more updates/modifications to be made for the mandatory values, one or more predefined criteria for the mandatory values, and/or one or more optional values that are currently assigned for any number of metrics. The client may provide the updates/modifications to the service for modification of the metric configuration of the edge devices, as described herein. For example, machine learning models/software may determine that the threshold for the mandatory value "port 80" for the "open ports" metric should be updated/changed from 99% to 98%. This may be in response to the machine learning models/software determining that when an edge device has "port 80" open for 98% of the metric values collected, the edge device is operating within specifications and therefore no violation/anomaly should be reported.

In embodiments, after the metric(s) configuration for a group/fleet of edge devices has been configured/applied by the service based on the user input (e.g., after the configuration manager 128 has configured the metric evaluator based on the metric configuration for the group/fleet of edge devices), the service may begin monitoring for metric anomalies across the received metric values from each edge device of the group/fleet using the mandatory and optional values for each metric.

For a given metric, the service may receive, from an edge device of the fleet, a plurality of values for the metric and the service may evaluate those values to determine whether anomalies exist (e.g., a group of 100 values). In embodiments, the service may evaluate a group of metrics every time a certain number of values have been received (every 100 values, 1000 values, etc.). In some embodiments, the service may evaluate a group of metric values that are received during certain time windows, regardless of how many values are received during that time window (e.g., every 2 minutes, 10 minutes, etc.).

The service may determine, based on the plurality of values (e.g., group of values) for the metric and the predefined criteria for the one or more mandatory values, whether the plurality of values satisfies the predefined criteria for the one or more mandatory values. If not, then the service may indicate an anomaly has been detected for the metric (e.g., a notification of the detected anomaly may be sent to the client). If so, then the service may determine, based on the plurality of values, whether a value other than the one or more mandatory values and the one or more optional values is present in the plurality of values. If so, then the service may indicate an anomaly has been detected (e.g., a notification of the detected anomaly may be sent to the client).

If the service determines that the plurality of values satisfies the predefined criteria for the one or more mandatory values and that a value other than the one or more mandatory values and the one or more optional values is not present in the plurality of received values, then the service may continue monitoring of the edge device for additional values for the metric without indicating an anomaly has been detected for the metric based on the received plurality of values. This may allow the service to use a smaller amount of compute resources to monitor for anomalies, compared to traditional techniques.

In various embodiments, at any point in time, a client (or an administrator of the provider network) may update/modify any of the mandatory values, optional values, and/or predefined criteria. After the service receives the updated mandatory values, optional values, and/or predefined criteria from a user, the service may evaluate subsequent groups of metric values based on those updates (e.g., after the configuration manager 128 has configured the metric evaluator based on the updated metric configuration for the group/fleet of edge devices).

A client may provide any number of updates/modifications to the service and based on the updates/modifications, the service will update the configuration and evaluate additional received data based on the updates/modifications. For example, the service may receive, from the client, an indication of new predefined criteria to replace current predefined criteria for mandatory values, removal of one or more predefined criteria, and/or addition of one or more predefined criteria to be used. In embodiments, the service may receive, from the client, an indication of new mandatory and/or optional values to replace current mandatory and/or optional values, removal of one or more mandatory and/or optional values, and/or addition of one or more mandatory and/or optional values. In embodiments, any of the above updates/modifications may be determined by the client and/or machine learning models/software, based on analysis of changes, variations, and/or patterns that occur for metric values that are collected for any number of metrics over a period of time (e.g., for a fleet of edge devices used in a production environment). In embodiments, this may allow a client to adapt/modify the detection of anomalies over time (e.g., due to changing network conditions or other environmental conditions for the fleet).

Figure 2:
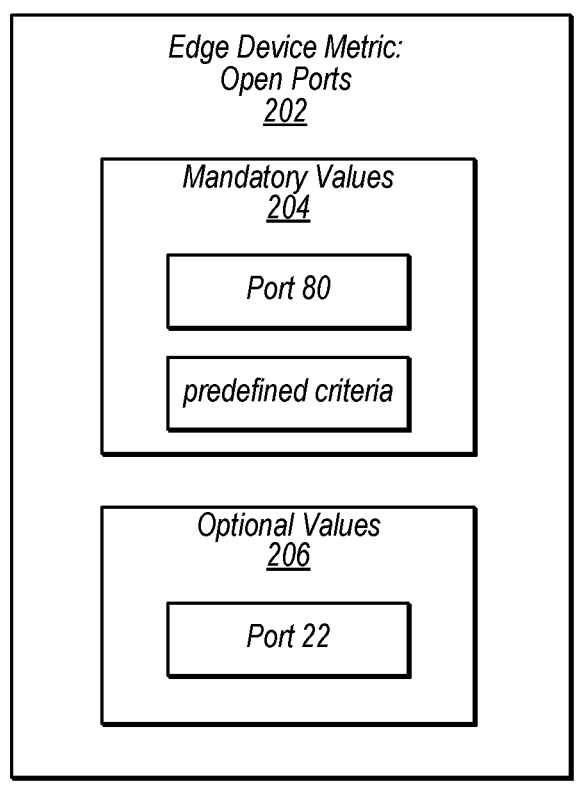
FIG. 2 illustrates an example of a metric configuration for edge devices, according to some embodiments.

FIG. 2 illustrates an example of a metric configuration for edge devices, according to some embodiments.

In the depicted embodiment, an edge device metric 202 called "open ports" has been configured for use with a group/fleet of edge devices of a client (e.g., edge devices 112a-112n of FIG. 1). In embodiments, each value of an open ports metric that is received from an edge device may include any number of open ports of the edge device (e.g., each metric value may be a list of ports that the edge device is listening on at the time the metric is collected by the edge device).

As shown, the open ports metric is configured with "port 80" as a mandatory value 204 and one or more predefined criteria for the mandatory value. The open ports metric is also configured with "port 22" as an optional value 206 for the metric. Therefore, any values that are received for the open ports metric other than "port 80" and "port 22" will result in the service indicating an anomaly has been detected for the metric. This may allow the service to efficiently detect port-related anomalies across a large number of edge devices in a much shorter amount of time, compared to traditional techniques.

Figure 3:
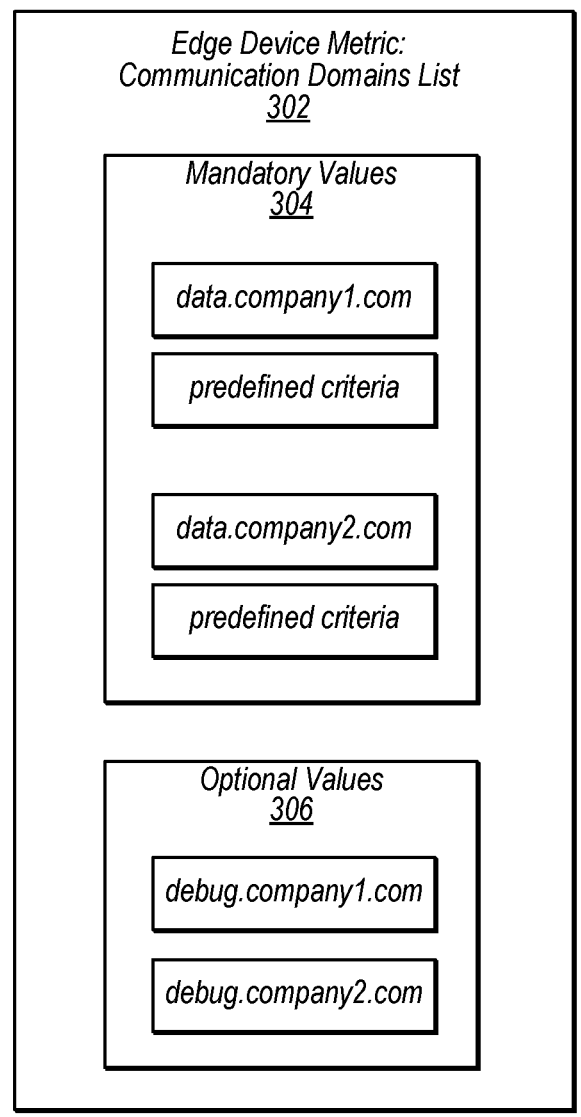
FIG. 3 illustrates an example of a metric configuration for edge devices, according to some embodiments.

FIG. 3 illustrates an example of a metric configuration for edge devices, according to some embodiments.

In the depicted embodiment, an edge device metric 302 called "communication domains list" has been configured for use with a group/fleet of edge devices of a client (e.g., edge devices 112a-112n of FIG. 1). In embodiments, each value of a communication domains list metric that is received from an edge device may include any number of domains that the edge device is communicating with (e.g., each metric value may be a list of domains that the edge device is communicating with and/or has an established connection with at the time the metric is collected by the edge device).

As shown, the communication domains list metric is configured with "data.company1.com" as a mandatory value 304, one or more predefined criteria for the mandatory value, "data.company2.com" as another mandatory value 304, and one or more predefined criteria for that mandatory value. The predefined criteria may be the same or different for each mandatory value. For example, the predefined criterium for the mandatory value "data.company1.com" may be configured with a threshold of 98% (e.g., at least 98% of metric values of a given group of metric values collected from the edge device must include "data.company1.com," whereas the predefined criterium for the mandatory value "data.company2.com" may be configured with a threshold of 99% (e.g., at least 99% of metric values of a given group of metric values collected from the edge device must include "data.company2.com" to satisfy the predefined criterium).

The communication domains list metric is also configured with "debug.company1.com" and "debug.company2.com" as optional values 306 for the metric. Therefore, any values that are received for the open ports metric other than "data.company1.com," "data.company1.com," "debug.company1.com," and "debug.company2.com" will result in the service indicating an anomaly has been detected for the metric. This may allow the service to efficiently detect domain-related anomalies across a large number of edge devices in a much shorter amount of time, compared to traditional techniques.

Figure 4:
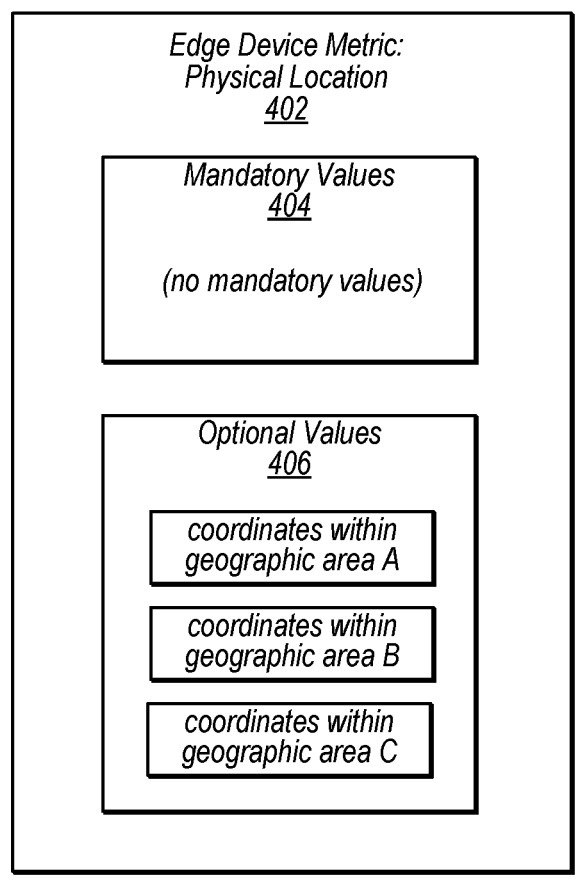
FIG. 4 illustrates an example of a metric configuration for edge devices, according to some embodiments.

FIG. 4 illustrates an example of a metric configuration for edge devices, according to some embodiments.

In the depicted embodiment, an edge device metric 402 called "physical location" has been configured for use with a group/fleet of edge devices of a client (e.g., edge devices 112a-112n of FIG. 1). In embodiments, a value of a physical location metric that is received from an edge device may include coordinates that indicate a location of the edge device (e.g., the metric value may be coordinates (e.g., global positioning system (GPS) or other type of coordinates) that indicate a geographical location of the edge device at the time the metric is collected by the edge device).

As shown, the physical location metric is configured with no mandatory value. Therefore, in some embodiments, zero or more mandatory values may be assigned/configured for a given metric (in some embodiments, zero or more optional values may be assigned/configured for a given metric; e.g., only one or more mandatory values may be assigned/configured).

The physical location metric is configured with three different optional values: coordinates within geographical area A (e.g., a client site or other area), coordinates within geographical area B (e.g., another client site or other area), and coordinates within geographical area C (e.g., another client site or other area). Therefore, any values that are received for the physical location metric that are coordinates other than the coordinates within area A, B, and C will result in the service indicating an anomaly has been detected for the metric. This may allow the service to efficiently detect location-related anomalies across a large number of edge devices in a much shorter amount of time, compared to traditional techniques.

In various embodiments, any number of other edge device metrics may be configured for a fleet. For example, a particular client may want to only allow certain TLS cipher suites to be used for connections with the edge devices of a fleet. The client, for example, may indicate two optional values for the "TLS cipher suite" metric: "ECDHE-ECDSA-AES128-GCM-SHA256" and "ECDHE-RSA-AES128-GCM-SHA256." If any other TLS cipher suite is used or attempted to be used for a connection for one of the edge devices (e.g., AES128-SHA256), than the service may indicate an anomaly for the "TLS cipher suite" metric for that edge device.

Embodiments may allow a client to configure anomaly detection for metrics that are not traditional time series metrics (e.g., "non-time series" metrics and/or "non-numeric" metrics). In other words, a client may define/assign "categorical" metric values for a metric to be monitored, without the need to define a particular time period/frequency of collection and/or without the need for the metric values to be numbers. For example, the "open ports" metric, the "communication domains list" metric, and the "physical location" metrics described in FIGS. 2, 3, and 5 may be examples of "non-time series" metrics and/or "non-numeric" metrics (e.g., categorical metrics), at least because they are not collected at a particular frequency/schedule and the values collected are not numbers/numerical or are not treated as numbers (e.g., no numerical calculations are performed using the metric values).

By allowing a client to easily configure/customize any number non-time series metrics and/or non-numeric metrics (e.g., by configuring any number of mandatory values, optional values, and/or predefined criteria for mandatory values for a given metric of an edge device), the client gains flexibility and control for detecting many types of anomalies that are not available using traditional anomaly detection techniques. Note that any type and/or number of metrics/metric data may be used, in some embodiments (e.g., time series data, non-time series data, numeric data, and/or non-numeric data).

Figure 5:
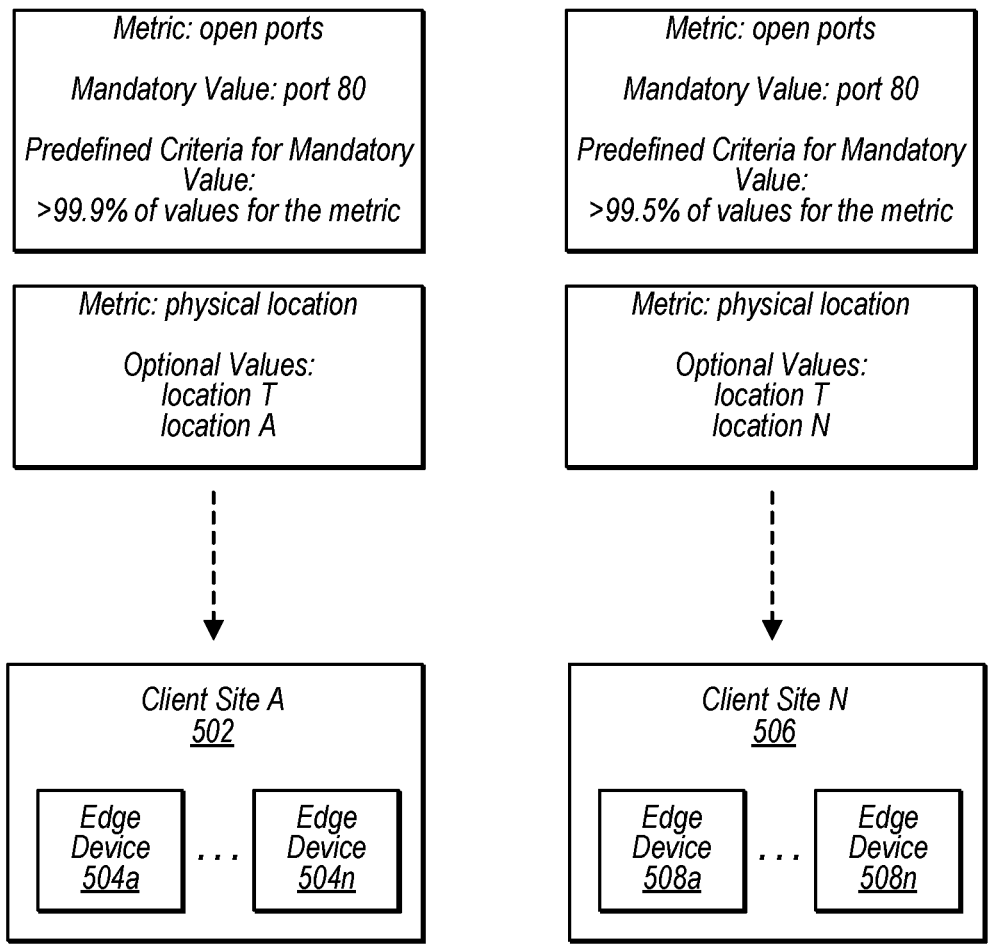
FIG. 5 illustrates an example of a metric configuration for different groups of a client's edge devices, according to some embodiments.

FIG. 5 illustrates an example of a metric configuration for different groups of a client's edge devices, according to some embodiments.

In the example embodiment, a client manages client site A 502 that includes a group of edge devices 504a-n and client site N 506 that includes another group of edge devices 508a-n. As shown, the client has created a different configuration (e.g., via input using a management device) for the same metrics at each of the client sites.

As shown, the predefined criteria for the mandatory value of "port 80" for the open ports metric for the group of edge devices 504a-n will cause the service to determine that the plurality of values (e.g., 1000 values) received from a given edge device 504 satisfies the predefined criteria for the mandatory value if at least 99.9% of the values for the metric include/match "port 80"; otherwise, the service will indicate an anomaly is detected. However, the predefined criteria for the mandatory value of "port 80" for the open ports metric for the group of edge devices 508a-n will cause the service to determine that the plurality of values (e.g., 1000 values) received from a given edge device 508 satisfies the predefined criteria for the mandatory value if at least 99.5% of the values for the metric include/match "port 80"; otherwise, the service will indicate an anomaly is detected.

FIG. 5 also depicts different optional values for the physical location metric. In the example, location T represents a geographic area of a test facility, location A represents a geographic area of client site A, and location N represents a geographic area of client site N. As shown, the optional values for the physical location metric for the group of edge devices 504a-n includes location T and location A, whereas the optional values for the physical location metric for the group of edge devices 504a-n includes location T and location N.

Figure 6:
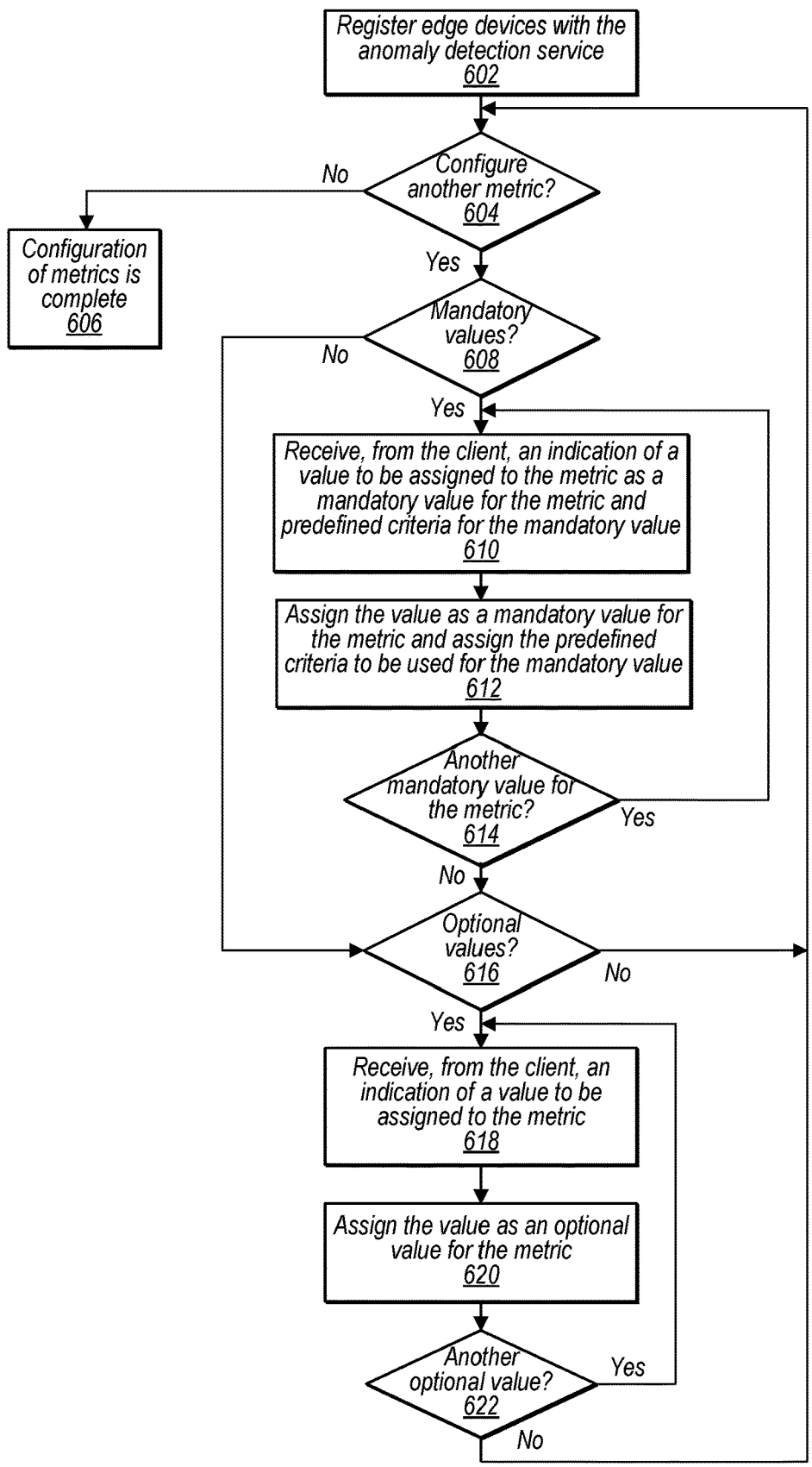
FIG. 6 is a high-level flowchart illustrating various methods and techniques for configuring a system for monitoring for metric anomalies across high-scale data using mandatory and optional values for metrics, according to some embodiments.

FIG. 6 is a high-level flowchart illustrating various methods and techniques for configuring a system for monitoring for metric anomalies across high-scale data using mandatory and optional values, according to some embodiments. In various embodiments, any of the functionality described for any portions of the flowcharts 6-7 may be performed by any of the components of FIGS. 1-5 and/or 8.

Figure 7:
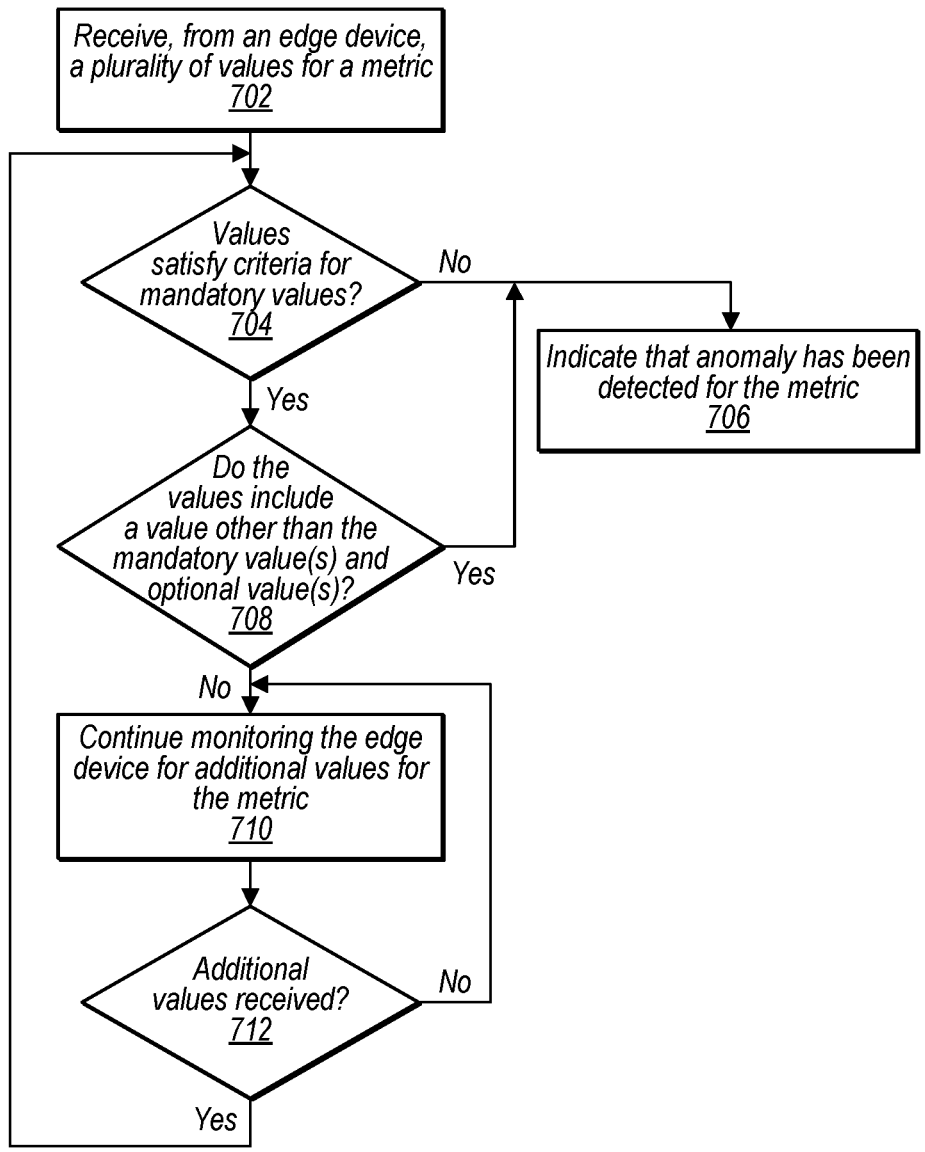
FIG. 7 is a high-level flowchart illustrating various methods and techniques to monitor for metric anomalies across high-scale data using mandatory and optional values for a metric, according to some embodiments.

These techniques, as well as the techniques discussed with regard to FIG. 7, may be implemented using components or systems as described above with regard to FIGS. 1-5, as well as other types of components or systems, and thus the following discussion is not intended to be limiting as to the other types of systems that may implement the described techniques. For example, any of the techniques may be implemented by one or more services of a provider network and/or a local service/application of a client network.

At block 602, the anomaly detection service registers edge devices with the anomaly detection service (e.g., a group/fleet of edge devices). At block 604, the service determines whether there is another edge device metric to configure. If not, the configuration of metrics is complete at block 606.

At block 604, if the service determines there is another edge device metric to configure, then at block 608, the service determines whether there are any mandatory values to configure for the metric. If so, then at block 610, the service receives, from the client, an indication of a value to be assigned to the metric as a mandatory value for the metric and/or predefined criteria for the mandatory value.

At block 612, the service assigns the value as a mandatory value for the metric and/or the predefined criteria to be used for the mandatory value. At block 614, if the service determines there is another mandatory value to configure for the metric, the process returns to block 610; otherwise, at block 616, the service determines whether there are any optional values to configure.

If there are no optional value to configure, the process returns to block 604. If there are, then at block 618, the service receives, from the client, an indication of a value to be assigned to the metric. At block 620, the service assigns the value as an optional value for the metric.

At block 622, the service determines if there is another optional value to configure. If so, the process returns to block 618; otherwise, the process returns to block 604. Returning to block 608, if the service determines there are no mandatory values to configure, then the process proceeds to block 616.

FIG. 7 is a high-level flowchart illustrating various methods and techniques to monitor for metric anomalies across high-scale data using mandatory and optional values for a metric, according to some embodiments.

At block 702, the anomaly detection service receives, from an edge device, a plurality of values for a metric (e.g., a group of 1000 values, where each of the values may include any number of mandatory values and/or optional values and/or other values). At block 704, the service determines whether the received values satisfy the one or more predefined criteria for each of the mandatory values. If not, then at block 706, the service indicates that an anomaly has been detected for the metric; otherwise, at block 708, the service determines if the received values include a value other than the mandatory values and the optional values. If so, then at block 706, the service indicates that an anomaly has been detected for the metric.

If the service determines that the received values do not include a value other than the mandatory values and the optional values, then at block 708, the service continues monitoring the edge device for additional values for the metric (e.g., for another group of 1000 values).

At block 712, the service determines whether the additional values have been received (e.g., another group of 1000 values have been received). If not, then the service continues monitoring at block 710; otherwise, the process returns to block 704 to process the additional values that were received.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of the anomaly detection service and any other components that implement the techniques described herein). The various methods as illustrated in the figures and described herein represent example embodiments of methods. The order of any method may be changed, and various elements may be added, reordered, combined, omitted, modified, etc.

Figure 8:
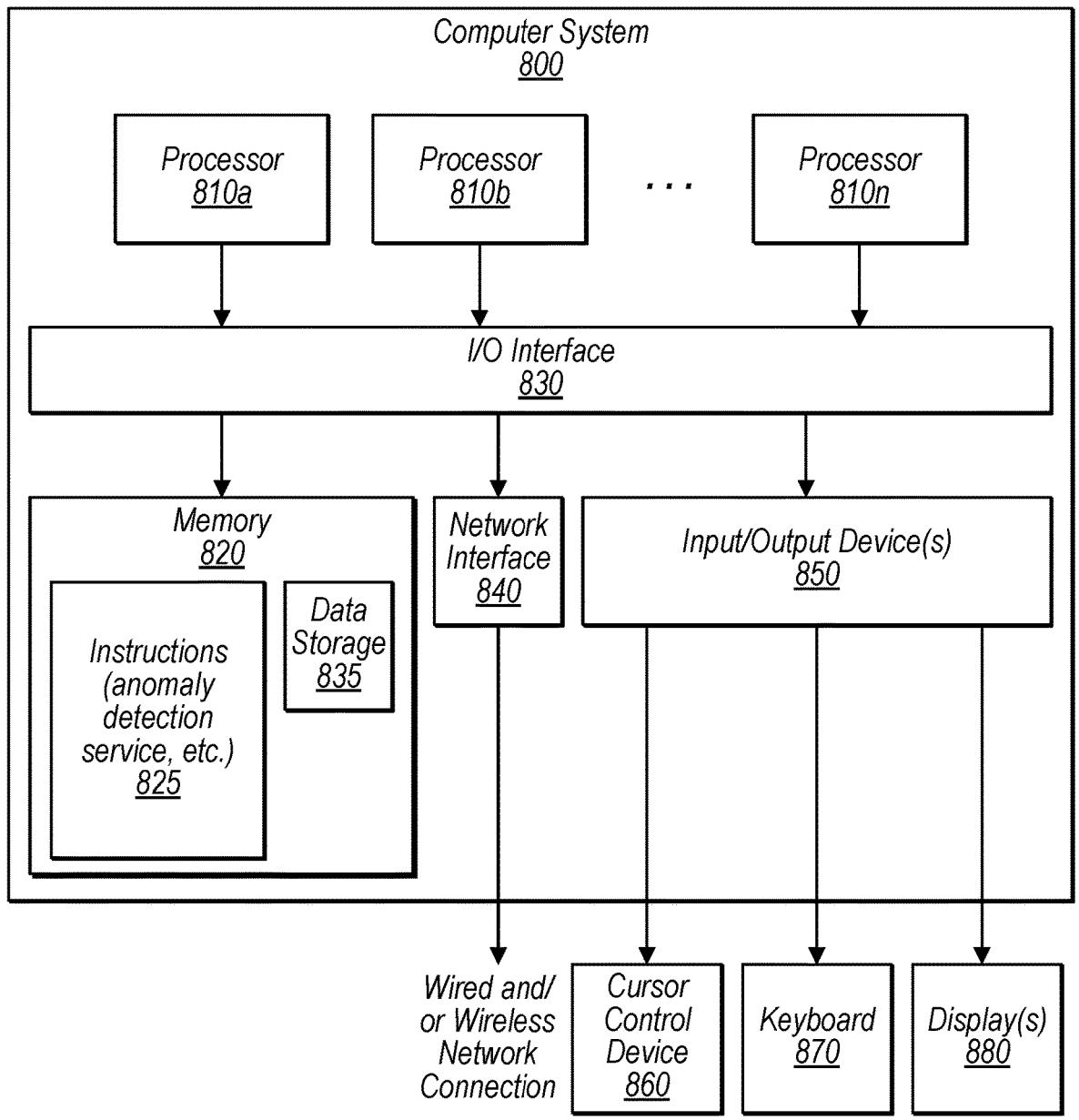
FIG. 8 is a block diagram illustrating an example computing system, according to some embodiments.

Embodiments to implement monitoring for metric anomalies across high-scale data using mandatory and optional values, which may interact with various other systems or devices. One such computer system is illustrated by FIG. 8. In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. Display(s) may include standard computer monitor(s) and/or other display systems, technologies or devices, in one embodiment. In some embodiments, it is contemplated that embodiments may be implemented using a single instance of computer system 800, while in other embodiments multiple such systems, or multiple nodes making up computer system 800, may host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions, in one embodiment. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 820 may store program instructions 825 and/or data accessible by processor 810, in one embodiment. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the anomaly detection service and any other components) are shown stored within system memory 820 as program instructions 825 and data storage 835, respectively. In other embodiments, program instructions and/or data may be received, sent or stored upon different types of computer-accessible media or on similar media separate from system memory 820 or computer system 800. A computer-accessible medium may include non-transitory storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840, in one embodiment.

In one embodiment, I/O interface 830 may be coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may allow data to be exchanged between computer system 800 and other devices attached to a network, such as other computer systems, or between nodes of computer system 800, in one embodiment. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800, in one embodiment. Multiple input/output devices 850 may be present in computer system 800 or may be distributed on various nodes of computer system 800, in one embodiment. In some embodiments, similar input/output devices may be separate from computer system 800 and may interact with one or more nodes of computer system 800 through a wired or wireless connection, such as over network interface 840.

As shown in FIG. 8, memory 820 may include program instructions 825 that implement the various embodiments of the systems as described herein, and data store 835, comprising various data accessible by program instructions 825, in one embodiment. In one embodiment, program instructions 825 may include software elements of embodiments as described herein and as illustrated in the Figures. Data storage 835 may include data that may be used in embodiments (e.g., metric values, metric configurations, etc.). In other embodiments, other or different software elements and data may be included.

Those skilled in the art will appreciate that computer system 800 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 800 may be transmitted to computer system 800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors and one or more memories, wherein the one or more memories have stored thereon instructions, which when executed by the one or more processors, cause the one or more processors to implement an anomaly detection service for a plurality of clients of a provider network, wherein the anomaly detection service is configured to, for a given client of the plurality of clients of the anomaly detection service:
for a given metric to be monitored for a plurality of edge devices of the client:
receive, from the client, a first set of values as mandatory values to be associated with the metric;
receive, from the client, predefined criteria associated with the first set of values;

receive, from the client, a second set of values as optional values to be associated with the metric;

assign the first set of values to the metric as mandatory values for the metric;

assign the second set of values to the metric as optional values for the metric;

receive, from an edge device of the plurality of edge devices, a plurality of values for the metric;

determine, based on the plurality of values received from the edge device for the metric and the predefined criteria, that the plurality of values received from the edge device satisfies the predefined criteria for the mandatory values for the metric;

determine that the plurality of values received from the edge device do not include any values that are not present in the mandatory values for the metric and the optional values for the metric; and in response to the determination that the plurality of values received from the edge device satisfies the predefined criteria for the mandatory values for the metric and that the plurality of values received from the edge device do not include any values that are not present in the mandatory values for the metric and the optional values for the metric, continue monitoring of the edge device for additional values for the metric without indicating an anomaly has been detected for the metric.

2. The system as recited in claim 1, wherein the anomaly detection service is further configured to:

receive, from the edge device, a plurality of additional values for the metric;

determine, based on the plurality of additional values for the metric and the predefined criteria for the mandatory values, that the plurality of additional values satisfies the predefined criteria for the mandatory values;

determine an anomaly exists in the plurality of additional values, including a value not present in the mandatory values and the optional values; and in response to the determination that the anomaly exists, indicate that an anomaly has been detected for the metric.

3. The system as recited in claim 1, wherein the anomaly detection service is further configured to:

receive, from the edge device, a plurality of additional values for the metric;

determine, based on the plurality of additional values for the metric and the predefined criteria for the mandatory values, that the plurality of additional values does not satisfy the predefined criteria for the mandatory values; and in response to the determination that the plurality of additional values does not satisfy the predefined criteria for the mandatory values, indicate that an anomaly has been detected for the metric.

4. The system as recited in claim 1, wherein the anomaly detection service is further configured to:

receive, from the client, an indication of a different criteria to be used as the predefined criteria for the mandatory values;

update the predefined criteria based on the different criteria to generate updated predefined criteria; and receive, from the edge device, a plurality of additional values for the metric;

determine, based on the plurality of additional values for the metric and the updated predefined criteria for the mandatory values, that the plurality of additional values does not satisfy the updated predefined criteria for the mandatory values; and in response to the determination that the plurality of additional values does not satisfy the updated predefined criteria for the mandatory values, indicate that an anomaly has been detected for the metric.

5. The system as recited in claim 1, wherein the anomaly detection service is further configured to:

receive, from the client, an indication of an additional value to be assigned to the metric as one of the optional values for the metric;

update the optional values based on the additional value to generate updated optional values for the metric; and receive, from the edge device, a plurality of additional values for the metric;

determine, based on the plurality of additional values for the metric and the predefined criteria for the mandatory values, that the plurality of additional values satisfies the predefined criteria for the mandatory values;

determine, based on the plurality of additional values, that a value other than the mandatory values and the updated optional values is present in the plurality of additional values; and in response to the determination that the value other than the mandatory values and the updated optional values is present in the plurality of additional values, indicate that an anomaly has been detected for the metric.

6. A method, comprising:

performing, by one or more computing devices of a provider network that implement an anomaly detection service:

receiving, from an edge device of a plurality of edge devices of a client, a plurality of values for a metric;

determining, based on the plurality of values received from the edge device for the metric and predefined criteria associated with mandatory values for the metric, that the plurality of values received from the edge device satisfies the predefined criteria for the mandatory values for the metric, wherein a first set of values is assigned to the metric as the mandatory values for the metric;

determining that the plurality of values received from the edge device do not include any values that are not present in the mandatory values for the metric and optional values for the metric, wherein a second set of values is assigned to the metric as the optional values for the metric; and in response to determining that the plurality of values received from the edge device satisfies the predefined criteria for the mandatory values for the metric and that the plurality of values received from the edge device do not include any values that are not present in the mandatory values for the metric and the optional values for the metric, continue monitoring the edge device for additional values for the metric without indicating an anomaly has been detected.

7. The method as recited in claim 6, further comprising:

receiving, from the edge device, a plurality of additional values for the metric;

determining, based on the plurality of additional values for the metric and the predefined criteria for the mandatory values, that the plurality of additional values satisfies the predefined criteria for the mandatory values;

determining an anomaly exists in the plurality of additional values, including a value not present in the mandatory values and the optional values; and in response to determining that the anomaly exists, indicating that an anomaly has been detected for the metric.

8. The method as recited in claim 7, further comprising:
receiving, from the edge device, a plurality of additional values for the metric;
determining, based on the plurality of additional values for the metric and the predefined criteria for the mandatory values, that the plurality of additional values does not satisfy the predefined criteria for the mandatory values; and
in response to determining that the plurality of additional values does not satisfy the predefined criteria for the mandatory values, indicating that an anomaly has been detected for the metric.

9. The method as recited in claim 6, further comprising:
receiving, from the client, an indication of a different criteria to be used as the predefined criteria for the mandatory values; and
in response to receiving the indication of the different criteria, updating the predefined criteria based on the different criteria to generate an updated predefined criteria to be used for evaluation of subsequently received values for the metric.

10. The method as recited in claim 9, further comprising:
receiving, from the client, a request to remove one of the optional values; and
in response to receiving the request to remove the optional value, remove the optional value from the optional values to generate updated optional values to be used for evaluation of subsequently received values for the metric.

11. The method as recited in claim 9, further comprising:
receiving, from the client, a request to replace one of the optional values with a different optional value; and
in response to receiving the request to replace the optional value, replace the optional value with the different optional value to generate updated optional values to be used for evaluation of subsequently received values for the metric.

12. The method as recited in claim 6, wherein the metric comprises ports of the edge device that are open, and wherein the mandatory values comprise a particular port of the edge device, and wherein the optional values comprise a different port of the edge device.

13. The method as recited in claim 6, wherein the metric comprises domain names the edge device is communicating with, and wherein the mandatory values comprise a particular domain name, and wherein the optional values comprise a different domain name.

14. The method as recited in claim 6, further comprising, for another group of the plurality of edge devices of a client:
receiving, from the client, an indication that different criteria are to be used as predefined criteria for mandatory values for the metric, or
receiving, from the client, an indication that different values are to be assigned to the metric as optional values for the metric.

15. One or more non-transitory computer-accessible storage media storing program instructions that when executed on or across one or more processors cause the one or more processors to:
receive, from an edge device of a plurality of edge devices of a client, a plurality of values for a metric;
determine, based on the plurality of values received from the edge device for the metric and predefined criteria associated with mandatory values for the metric, that the plurality of values received from the edge device satisfies the predefined criteria for the mandatory values for the metric, wherein a first set of values is assigned to the metric as the mandatory values for the metric;
determine that the plurality of values received from the edge device do not include any values that are not present in the mandatory values for the metric and optional values for the metric, wherein a second set of values is assigned to the metric as the optional values for the metric; and
in response to the determination that the plurality of values received from the edge device satisfies the predefined criteria for the mandatory values for the metric and that the plurality of values received from the edge device do not include any values that are not present in the mandatory values for the metric and the optional values for the metric, continue monitoring of the edge device for additional values for the metric without indicating an anomaly has been detected.

16. The one or more storage media as recited in claim 15, wherein the program instructions when executed on or across the one or more processors further cause the one or more processors to:
receive, from the edge device, a plurality of additional values for the metric;
determine, based on the plurality of additional values for the metric and the predefined criteria for the mandatory values, that the plurality of additional values satisfies the predefined criteria for the mandatory values;
determine an anomaly exists in the plurality of additional values including a value not present in the mandatory values and the optional values; and
in response to the determination that the anomaly exists, indicate that an anomaly has been detected for the metric.

17. The one or more storage media as recited in claim 16, wherein the program instructions when executed on or across the one or more processors further cause the one or more processors to:
receive, from the edge device, a plurality of additional values for the metric;
determine, based on the plurality of additional values for the metric and the predefined criteria for the mandatory values, that the plurality of additional values does not satisfy the predefined criteria for the mandatory values; and
in response to the determination that the plurality of additional values does not satisfy the predefined criteria for the mandatory values, indicate that an anomaly has been detected for the metric.

18. The one or more storage media as recited in claim 15, wherein to determine that the plurality of values satisfies the predefined criteria for the mandatory values, the program instructions when executed on or across the one or more processors further cause the one or more processors to:
determine that at least a threshold percentage of the plurality of values for the metric matches a particular one of the mandatory values.

19. The one or more storage media as recited in claim 15, wherein the metric comprises a physical location of the edge device, and wherein the optional values comprise a plurality of coordinates within a plurality of geographic areas.

20. The one or more storage media as recited in claim 15, wherein the metric comprises cipher suites used by the edge device for communication, and wherein the optional values comprise a plurality of cipher suites.

\* \* \* \* \*